United States Patent
Cuero et al.

(10) Patent No.: US 7,309,437 B2
(45) Date of Patent: Dec. 18, 2007

(54) COMPOSITIONS AND METHODS FOR REMOVAL OF TOXIC METALS AND RADIONUCLIDES

(75) Inventors: Raul G. Cuero, Cypress, TX (US); David S. McKay, Friendswood, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 11/031,088

(22) Filed: Jan. 6, 2005

(65) Prior Publication Data

US 2007/0262026 A1 Nov. 15, 2007

Related U.S. Application Data

(60) Provisional application No. 60/534,805, filed on Jan. 7, 2004.

(51) Int. Cl.
*C02F 3/00* (2006.01)
(52) U.S. Cl. .................... 210/682; 210/688; 210/912; 210/913; 210/914
(58) Field of Classification Search .............. 210/688, 210/912–914, 682
See application file for complete search history.

(56) References Cited

U.S. PATENT DOCUMENTS

| | | | |
|---|---|---|---|
| 4,424,346 A | 1/1984 | Hall et al. ................ 536/20 |
| 4,775,650 A * | 10/1988 | Portier ..................... 502/62 |
| 4,835,265 A | 5/1989 | Muzzarelli ............... 536/18.7 |
| 5,421,897 A * | 6/1995 | Grawe ..................... 134/6 |
| 5,433,865 A * | 7/1995 | Laurent ................... 210/727 |
| 6,764,988 B2 * | 7/2004 | Koenig et al. ............ 510/130 |

OTHER PUBLICATIONS

□□Petrikova, V., (Derwent-Acc-No: 2001-030446) (2004) "Cleaning of domestic and industrial water containing e.g. heavy metals comprises passage through a volcanic ash filter also removing organic and inorganic impurities and oil residues".*
Bulman, Chemistry of Plutonium and the Transurancis in the Biosphere, Struct. Bonding 34, pp. 39-77, 1978.
Muzzarelli et al., Chelating, Film-forming, and Coagulating ability of the chitosan-glucan complex from Aspergillus niger industrial wastes. Biotechnology and Bioengineering, vol. 22, pp. 885-896. John Wiley & Sons, Inc., 1980.
Tsezos et al., Bio-sorption of Uranium and Thorium, Biotechnology and Bioengineering 22, pp. 583-604, 1981.
Nash et al., Redox Behavior, Complexing and Adsorption of Hexavalent Actinides by Jumic Acid and Selected Clays, Environ. Sci. Technol. 15, pp. 834-837, 1981.

(Continued)

*Primary Examiner*—Chester T. Barry
(74) *Attorney, Agent, or Firm*—Baker Botts L.L.P.

(57) ABSTRACT

The present invention relates to compositions and methods for the removal of toxic metals or radionuclides from source materials. Toxic metals may be removed from source materials using a clay, such as attapulgite or highly cationic bentonite, and chitin or chitosan. Toxic metals may also be removed using volcanic ash alone or in combination with chitin or chitosan. Radionuclides may be removed using volcanic ash alone or in combination with chitin or chitosan.

20 Claims, 4 Drawing Sheets

OTHER PUBLICATIONS

Yang et al., Absorption of Metals by Natural Polymers Generated from Seafood Processing Wastes, Ind. Eng. Chem. Prod. Res. 23(1), pp. 168-172, 1984.

Yalpani, M., Some Chemical and Analytical Aspects of Polysaccharides Modification, Macromolecules, vol. 17, pp. 272-281, 1984.

Hutchins et al., Microorganisms in Reclamation of Metals, Annual Review of Microbiology 40, pp. 311-336, 1986.

Fedorak et al., Microbial Release of $^{226}Ra^{2+}$ from (Ba, Ra) $SO_4$ Sludges from Uranium Mine Wastes, Appl Environ, Microbiol, 52, pp. 262-268, 1986.

Baran, Flocculation of Cellular Suspensions by Polyelectrolytes. Colloidds and Surfaces, 31, pp. 259-264, 1988.

Muzarelli et al., Removal of Trace Metal Ions from Industrial Waters, Unclear effluents and Drinking Water, with the aid of Cross-linked N-carboxymethyl chitosan, Carbohydrate Polymers 11, pp. 193, 1989.

Hughes et al., Improved Separation of Bacteria with a Dual Flocculant Hydrocol™ System, Biotechnology Techniques, vol. 4, pp. 233-236, 1990.

Knorr, D., Recovery and Utilization of Chitin and Chitosan in Food Processing Waste Management, Food Technology, 1991.

Cuero, Enhanced Heavy Metal Immobilization.by a Bacterial-Chitosan Complex in Soil, Biotechnology Letter vol. 18 (5), pp. 511-514, 1996.

Allen et al., Microbial Life in Martian Regolith Simulant JSC MARS-1, Lunar and Planetary Science XXIX, 1998.

Means et al., Migration of Radioactive Wastes: Radionuclide Mobilization by Complexing Agents, Science 200, pp. 1477-1480, 1978.

Beveridge et al., Sites of Metal Deposition in Cell Wall of *Bacillus subtillis*, J. Bacteriol. 141, 876-887, 1980.

Strandberg et al., Microbial Cells as Bio-sorbent for Heavy Metals: Accumulation of Uranium by *Saccharomyces cerevisiae* and *Pseudomonas aeruginosa*, Appl. Environ. Microbiol. 41, pp. 237-245, 1981.

Tsezos et al., The Mechanism of Uranium Bio-sorption by Rhizopus Arrhizus, Biotechnology and Bioengineering 24, pp. 385-401, 1986.

* cited by examiner

COMPOSITIONS AND METHODS FOR REMOVAL OF TOXIC METALS AND RADIONUCLIDES

CROSS-REFERENCE TO RELATED APPLICATIONS

The present application claims priority under 35 U.S.C. §119(e) to U.S. Provisional Patent Application 60/534,805, filed Jan. 7, 2004, titled "Compositions and Methods for Removal of Toxic Metals and Radionuclides".

STATEMENT OF GOVERNMENT INTEREST

All of part of the present invention was developed using funding under NASA Contract Number NAG9-1241. The U.S. Government has certain rights in the invention.

FIELD OF THE INVENTION

The present invention relates to compositions and methods for removal of harmful materials. Specifically, it relates to the use of chitin, chitosan, clay and volcanic ash alone or in combinations to remove toxic metals or radionuclides.

BACKGROUND

A variety of processes have been developed to remove toxic metals or radioactive materials from the environment or from wastes. This prevents such harmful materials from reaching the environment, and also sometimes allows for their recovery and reuse.

Chemical, physical and biological methods have been used to recover and/or flocculate toxic metals or to recover radionuclides from wastes or other sources. However, these methods are not very efficient. In order to function, the recovery agent must be in continuous contact with the contaminated substrate for a long period of time. Additionally, these methodologies are expensive and not cost-effective.

Chemical treatments, which are commonly used to recover toxic metals and radionuclides, may lead to greater environmental pollution because they are not biodegradable. Biological agents, such as chitosan, are normally used as single treatments and suffer from poor efficacy and inconstant results. Microbial treatments also suffer from inconsistency and poor efficacy because the microbes may lose viability due to toxic effects of the metals or radionuclides absorbed. Microbial treatments are also not able to produce flocculation of toxic metals. Absorption of radionuclides using biomass from dead microorganisms has also been unsatisfactory, producing only low levels of bio-absorption or bio-accumulation. Finally, physical treatments alone are expensive and are not practical when applied on large scaled demanded by many potential uses, especially with toxic metals. Additionally, common physical treatments do not produce flocculation of toxic metals.

Accordingly, a reliable, effective, cost-efficient method of removing toxic metals or radionuclides from waste or other sources is needed.

SUMMARY OF THE INVENTION

The invention includes compositions for the removal of toxic metals or radionuclides from waste or other sources. Compositions for removal of toxic metals may include chitosan or chitin, which may be any form of chitosan or chitin, including chemically modified forms such as N-carboxymethyl chitosan. The chitosan or chitin may be combined with clay such as attapulgite or highly cationic bentonite clays for toxic metal removal. Another embodiment of the invention relates to the use of volcanic ash alone or with chitin or chitosan to remove radionuclides or toxic metals from source materials.

Embodiments of the present invention may use biodegradable materials to achieve consistent results. They may offer improvements over previous recovery systems by being useable with water or aqueous solutions rather than merely sludge. They may also be quicker than many existing recovery systems. Most embodiments of the invention do not require heat.

A more complete and thorough understanding of the present invention and advantages thereof may be acquired by referring to the following description taken in conjunction with the accompanying drawings.

DETAILED DESCRIPTION

The present invention includes compositions and methods for removal of toxic metals or radionuclides from wastes, residues, or other sources. The compositions and methods of the invention may remove any divalent or trivalent metal from a source material. Non-limiting examples of metals that may be removed include chromium, iron, cobalt, nickel, copper, zinc, silver, cadmium, osmium, mercury, lead, and uranium. The methods and compositions of the invention may remove one or more of these metals from any source materials including, without limitation, nuclear waste water, tanning waste, paint and paint waste materials, textile industry waste, battery fluids, oil industry waste, mining waste, dry cleaning or laundry waste, and military waste (e.g. from the production or use of small or heavy munitions).

For removal of toxic metals, chitin or chitosan and another natural material including clay such as attapulgite and highly cationic bentonite clays may be used. Volcanic ash alone or with chitosan is also suitable for removal of toxic metals and radionuclides.

Chitosan or chitin of the present invention may be any form of chitosan or chitin, including natural forms of chitosan ("native chitosan") and modified forms such as N-carboxymethyl chitosan ("NCMC"). Mixtures of chitosan and chitin or of different forms of each may be used in some embodiments. Chitin or chitosan may be from any suitable source, including seafood waste such as crustacean shells, fungi (including fungal fermentations such as citric acid production), actinomycetes, bacteria and algae.

According to embodiments of the invention using chitin or chitosan and clay, toxic metals that may be removed include lead, copper, zinc and chromium. The metals may be located in a solid or nearly solid source, such as sandy-powder, powder, soil and sludge or in a liquid source, such as drinking water, fresh water, lake water, sea water, river water and well water. The removal system may be located in a water filter to facilitate removal of toxic metals from water sources.

Toxic metals may be removed and disposed of or recovered for later uses. Removal may be monitored by measuring metal concentration in the source material, flocculation rate, or reduction or turbidity (% RT), among other methods.

Attapulgite is a colloidal clay mineral oxide and may be found from any of a variety of natural sources. Highly cationic bentonite clays are also found in nature and generally contain montmorillonite. Synthetic versions of attapulgite and bentonite may also be used in some embodiments of the present invention, if available. Attapulgite and bentonite may be chemically modified, although such modification is not normally necessary.

Generally, stock solutions, suspensions, or emulsions (collectively "stock solutions") of chitin, chitosan, clay and volcanic ash may be prepared. Such stock solutions may then be combined with a toxic source material.

The order in which the toxic metal source material, chitosan or chitin and clay are combined to form a mixture may vary in different embodiments of the invention and may produce different results. For example, clay may be applied to the source material before of after chitosan or chitin or at the same time.

Additionally, treatment conditions may vary in order to produce different results. For instance, the treatment may occur under shaken or static conditions for varying lengths of time. The pH of the mixture may be varied and the concentrations of the toxic material, chitosan or chitin, and clay may also be varied.

The time allowed for removal of toxic metals may vary among embodiments. However, in some embodiments of the present invention less than three minutes is required for an 87% turbidity reduction. Further, despite the quick flocculation time, approximately 90-95% of the toxic metal may be removed from the source material.

According to embodiments of the invention relating to removal of radionuclides such as uranium or toxic metals from source materials, volcanic ash may be used alone or with chitin or chitosan. The radionuclides or toxic metals may be located in a solid or nearly solid source, such as sandy-powder, powder, soil and sludge or in a liquid source, such as drinking water, fresh water, lake water, sea water, river water, well water, nuclear power sites, mining sites and agricultural lands. The removal system may be located in a water filter to facilitate removal of radionuclides or toxic metals from water sources.

Radionuclides or toxic metals may be removed and disposed of or recovered for later uses. Removal may be monitored by measuring radionuclide concentration or radioactivity in the source material, or by measuring toxic metal concentration in source material, among other methods.

Volcanic ash, including weathered volcanic ash, is available from a variety of natural sources and, if possible may be replicated synthetically. The volcanic ash may be modified if useful in some embodiments. In specific embodiments, Martian Regolith Simulant JSC MARS-1 (NASA, Houston, Tex.) may be used. JSC MARS-1 contains weathered volcanic ash from Pu'u Nene, a cinder cone located on the Island of Hawaii. The ash is a mixture of ash particles with alteration rinds of various thickness and particles of entirely altered ash. The ash is composed of finely crystalline and glassy particles of hawaiite composition. The crystalline magnetic grains are composed of feldspar and Ti-magnetite, along with minor amounts of olivine, pyroxine and glass. The non-magnetic fraction contains lesser concentrations of the same minerals and is a highly weathered glassy matrix. The grain size is primarily larger than 149 μm, while only 1 wt % of grains are smaller than 5 μm. JSC MARS-1 is significantly enriched in $Al_2O_3$ (from feldspar) and volatile components, primarily water. (Allen et al. (1998), Martian Regolith Simulant JSC MARS-1, *Lunar and Planetary Science XXIX*.) Similar weathered volcanic ash and other suitable volcanic ash will be readily identified by one skilled in the art.

The order in which the radionuclide or toxic metal source material, chitosan or chitin and volcanic ash are combined to form a mixture may vary in different embodiments of the invention and may produce different results. For example, volcanic ash may be applied to the source material before of after chitosan or chitin or at the same time. Additionally, application of volcanic ash alone provides and effective method of recovering radionuclides and toxic metals.

The ratio of attapulgite, sludge, and chitosan may vary according to the kind and concentration of metal to be removed from the sludge. In some non-limiting embodiments, the attapulgite:sludge:chitosan ratio may be selected from the group consisting of 1:80:250 (w/w/v), 1:80:250 (w/w/v), 1:80:200 (w/w/v), 2:80:250 (w/w/v), 2:80:200 (w/w/v), 3:120:300 (w/w/v), and 3:100:200 (w/w/v). Without being limited to any particular mechanism of action, the attapulgite may enhance the binding of chitosan to the metal to be removed.

The ratio of attapulgite, chitosan, and chromium may vary according to the concentration and valence of chromium in the source material. In some non-limiting embodiments, the attapulgite:chitosan:chromium ratio may be selected from the group consisting of 10:10:10 (v/v/v), 10:10:100 (v/v/v), 10:20:100 (v/v/v), and 20:10:100 (v/v/v). In some non-limiting embodiments, the attapulgite:chromium ratio may be from about 1:20 (v/v) to about 1:5 (v/v). In some non-limiting embodiments, the chitosan:chromium ratio may be from about 1:10 (v/v) to about 3:10 (v/v). For example, a chitosan:chromium ratio of 1:10 may be useful for treatment of drinking water. An attapulgite:chromium ratio of 10:10:100 may be useful where the chromium valence is 4 and a ratio of 10:20:100 may be useful where the chromium valence is 3.

Additionally, treatment conditions may vary in order to produce different results. For instance, the treatment may occur under shaken or static conditions for varying lengths of time. The pH of the mixture may be varied and the concentrations of the radionuclide, chitosan or chitin, and volcanic ash may also be varied.

EXAMPLES

The present examples are provided to further describe selected embodiments of the present invention. They are not intended, in whole or in part, to embody the entire extent of the invention. Some variations are described above and others will be apparent to those skilled in the art.

Example 1

Removal of Toxic Metals by Chitosan and Attapulgite

Both natural attapulgite (Attagel®, Engelhard Corporation, New Jersey) and 70% deacetylated native chitosan or NCMC were used alone or in combination to flocculate chromium ($Cr^{2+}$), lead ($Pb^{2+}$), copper ($Cu^{2+}$), and zinc ($Zn^{2+}$) contained in sludge material at different pHs (3.5 and 7.0). Water contaminated with chromium at different concentrations (0.50, 0.26, and 0.16 mg/l) was also treated with colloidal attapulgite or chitosan alone or in combination at different concentrations (attapulgite concentrations: 0.12%, 0.25%, and 0.65% (attapulgite/water; chitosan stock concentrations: 0.12%, 0.25%, 0.50% (w/v)). Concentrations of attapulgite stock solutions that were effective in the present invention include aqueous solutions of above 0.001% to about 2%, preferably about 0.01%, and more preferably about 0.1% (weight/volume). Attagel slurry solutions are used in the present example, but highly cationic bentonite clays are expected to perform equally well in recovering and/or flocculating chromium, lead, copper and zinc. Aqueous solutions of native chitosan or NCMC were used in the present example, but other derivatives of chitosan or chitin are expected to recover and/or flocculate the denoted toxic metals. Concentrations of chitosan that were effective in the present invention include aqueous solutions of above 0.001% to about 2%, preferably about 0.01%, and more preferably about 0.1% (weight/volume).

Chitosan solutions were prepared in acetic acid. The pH of the final mixture can readily be ascertained and adjusted by one skilled in the art. The pH of the final mixtures (chitosan+attapulgite+toxic metal) of the present example was either 3.5 or 7.0, preferably 3.5

Application of Attapulgite and Chitosan to Sludge Material

Houactinte (City of Houston, Tex.) was used as sludge material. Final mixtures of attapulgite+sludge+chitosan (either native chitosan or NCMC) were prepared at a ratio of 2:80:250 (w/w/v). These aqueous mixtures were adjusted to either pH 3.3 or 7.0 and were divided into different types of combinations. Samples of each combination were prepared in triplicate. (See Table 1 for treatment conditions studied.)

TABLE 1

Treatment Conditions for Aqueous Solutions of Sludge

| Combinations | pH |
| --- | --- |
| 1) Sludge alone | 7.0 |
| 2) Sludge alone | 3.5 |
| 3) Native chitosan + sludge | 7.0 |
| 4) Native chitosan + sludge | 3.5 |
| 5) NCMC + sludge | 7.0 |
| 6) NCMC + sludge | 3.5 |
| 7) Attapulgite + sludge | 7.0 |
| 8) Attapulgite + sludge | 3.5 |
| 9) Native chitosan + attapulgite + sludge | 7.0 |
| 10) Native chitosan + attapulgite + sludge | 3.5 |
| 11) NCMC + attapulgite + sludge | 7.0 |
| 12) NCMC + attapulgite + sludge | 3.5 |

Each sample was contained in a 500 mL flask, which was closed tightly. All samples were subject to shaking (300 RPM) at room temperature (25° C.) during the duration of the investigation (2 months).

Flocculation was measured by analyzing each sample once every week. Three ml of each sample was transferred into respective cuvettes, then vortex shaken for 30 seconds. Flocculation was determined spectrophotometrically. Flocculation/settlement of the solution was determined at different time intervals (2, 50, 10, 20, 60 and 120 minutes) after vortex shaking. However, 2, 5, 10 and 20 minute intervals were determined to yield the most useful measurements. Flocculation was expressed as the percentage reduction in turbidity (% RT) of the sample, measured spectrophotometrically at 600 nm (See Hughes et al. (1990), *Biotechnology Techniques*, Vol. 4: 233-236 for detailed procedure.) Table 2 shows the results of this analysis.

TABLE 2

Flocculation Time of Aqueous Solutions of Sludge After Treatment

| Combinations | pH | % RT at min after vortex | | | |
| --- | --- | --- | --- | --- | --- |
| | | 1 | 5 | 10 | 20 |
| 1) Sludge alone | 7.0 | 11% | 11% | 11% | 11% |
| 2) Sludge alone | 3.5 | 11% | 11% | 11% | 11% |
| 3) Native chitosan + sludge | 7.0 | 11% | 11% | 13% | 13% |
| 4) Native chitosan + sludge | 3.5 | 11% | 74% | 74% | 80% |
| 5) NCMC + sludge | 7.0 | 11% | 13% | 75% | 82.6% |
| 6) NCMC + sludge | 3.5 | 11% | 50% | 50% | 60% |
| 7) Attapulgite + sludge | 7.0 | 11% | 75% | 75% | 82.6% |
| 8) Attapulgite + sludge | 3.5 | 11% | 39.4% | 65.2% | 74% |
| 9) Native chitosan + attapulgite + sludge | 7.0 | 11% | 50% | 50% | 60% |
| 10) Native chitosan + attapulgite + sludge | 3.5 | 11% | 82.6% | 82.6% | 87% |
| 11) NCMC + attapulgite + sludge | 7.0 | 11% | 35% | 39.4% | 60% |
| 12) NCMC + attapulgite + sludge | 3.5 | 11% | 75% | 82.6% | 82.6% |

Table 2 shows that chitosan (either native or NCMC) combined with attapulgite (Combinations 10 and 12) greatly increases flocculation of heavy metal contaminated sludge at pH 3.5 as compared to other combinations studied. Further, the native chitosan+attapulgite treatment mixture shows a high % RT (>80% RT) after only 5 minutes. Even relatively effective single constituent treatments did not show similarly high % RT until after 20 minutes. Similarly, the NCMC+attapulgite combination showed >80% RT after only 10 minutes. Therefore, the chitosan+attapulgite combinations were more efficient at flocculating toxic metals in the sludge solution than single constituent treatments, especially at low pH.

The samples were also analyzed for toxic metal content in settled sludge after four weeks of incubation. Acid digestion was used to determine lead, chromium, copper, and zinc content of the samples. This was followed by flame furnace atomic absorption spectroscopy (FLAA or GFAA) or by inductively coupled argon plasma spectroscopy (ICP) performed according to US EPA standards (USEPA Single Laboratory Evaluation of Inductively Coupled Optical Emission Method 6010 (1984)). Results are presented in Table 3.

TABLE 3

Levels of Total Metal Accumulation in Sludge After Treatment

| Combinations | pH | Metal in Sludge (mg/L)* | | | |
|---|---|---|---|---|---|
| | | Pb | Cr | Cu | Zn |
| 1) Sludge alone | 7.0 | <0.05 | <0.05 | 0.01 | <0.01 |
| 2) Sludge alone | 3.5 | <0.05 | <0.05 | 0.01 | 0.01 |
| 3) Native chitosan + sludge | 7.0 | <0.05 | ND | ND | ND |
| 4) Native chitosan + sludge | 3.5 | 120 | 1.0 | 0.37 | 550 |
| 7) Attapulgite + sludge | 7.0 | <0.05 | ND | ND | ND |
| 8) Attapulgite + sludge | 3.5 | <0.05 | ND | ND | ND |
| 9) Native chitosan + attapulgite + sludge | 7.0 | <0.05 | ND | ND | ND |
| 10) Native chitosan + attapulgite + sludge | 3.5 | 110 | ND | ND | ND |
| 11) NCMC + attapulgite + sludge | 7.0 | <0.05 | ND | ND | ND |
| 12) NCMC + attapulgite + sludge | 3.5 | 83 | 0.59 | 0.32 | 530 |

*ND = not detected

The results in Table 3 indicate that chitosan+attapulgite combinations at pH 3.5 (Combinations 10 and 12), particularly NCMC+attapulgite, are also effective at recovering toxic metals from the sludge solutions.

Application of Attapulgite and Chitosan to Water Contaminated with Chromium

Slurry solutions of attapulgite at different concentrations (0.125%, 0.25% and 0.65% (w/v)) and aqueous solutions of chitosan (native chitosan or NCMC) at different concentrations (0.12%, 0.25% and 0.50% (w/v)) were applied as single or mixed treatments to water contaminated with chromium at different concentrations (51, 26 and 16 mg/L). Combinations were applied in the following ratios: 10:20:100 attapulgite:chitosan:chromium (v/v/v), 10:100 attapulgite:chromium (v/v), or 20:100 chitosan:chromium (v/v). Chitosan and attapulgite were applied alone or in combination simultaneously or sequentially. All solutions were adjusted to pH 3.5 after initial preparation and addition of the appropriate combination (if any).

Figure 1:
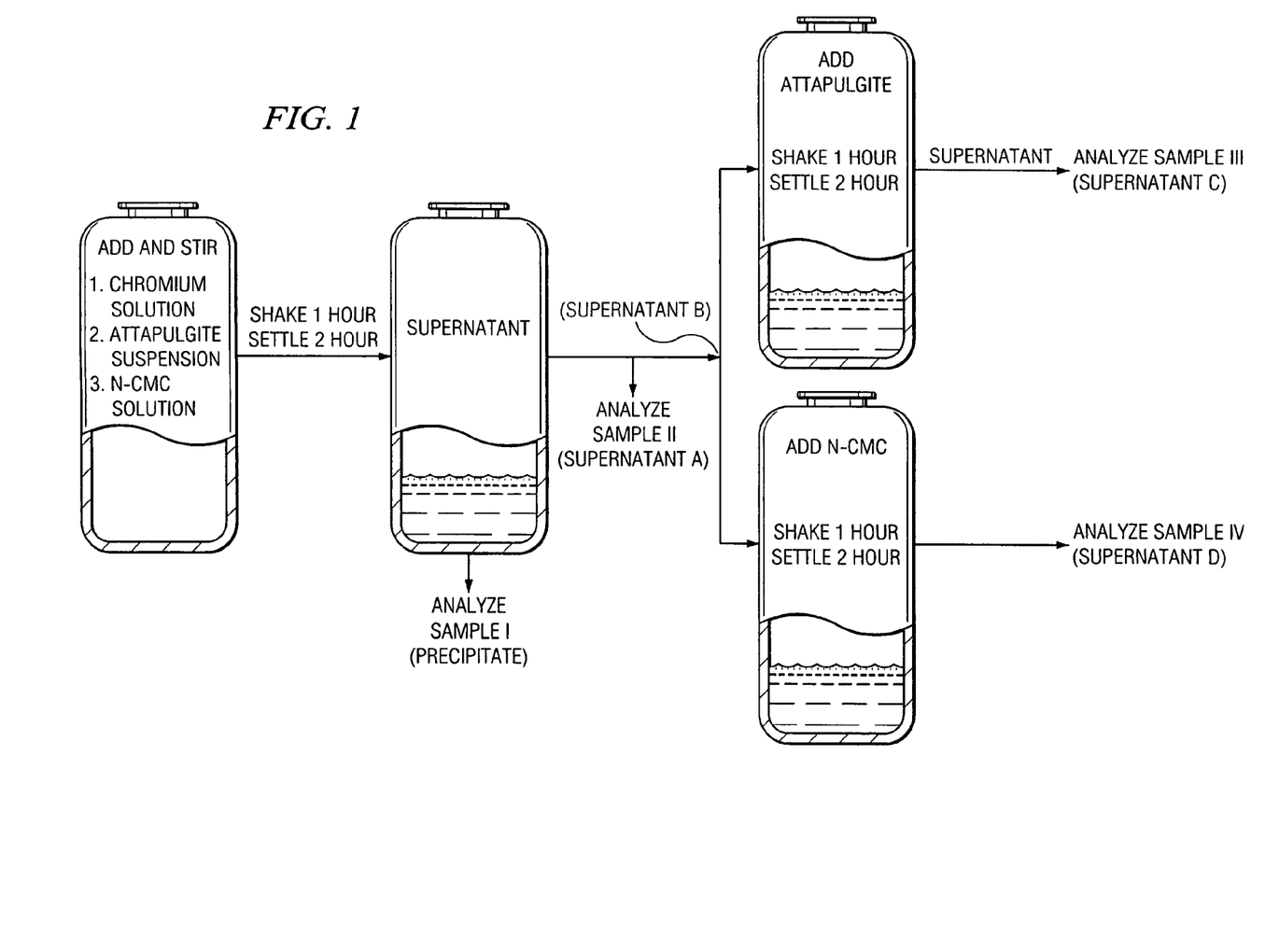
FIG. 1 depicts a method of chromium recovery by attapulgite and N-carboxymethyl chitosan in an aqueous solution, according to an embodiment of the present invention.
Figure 2:
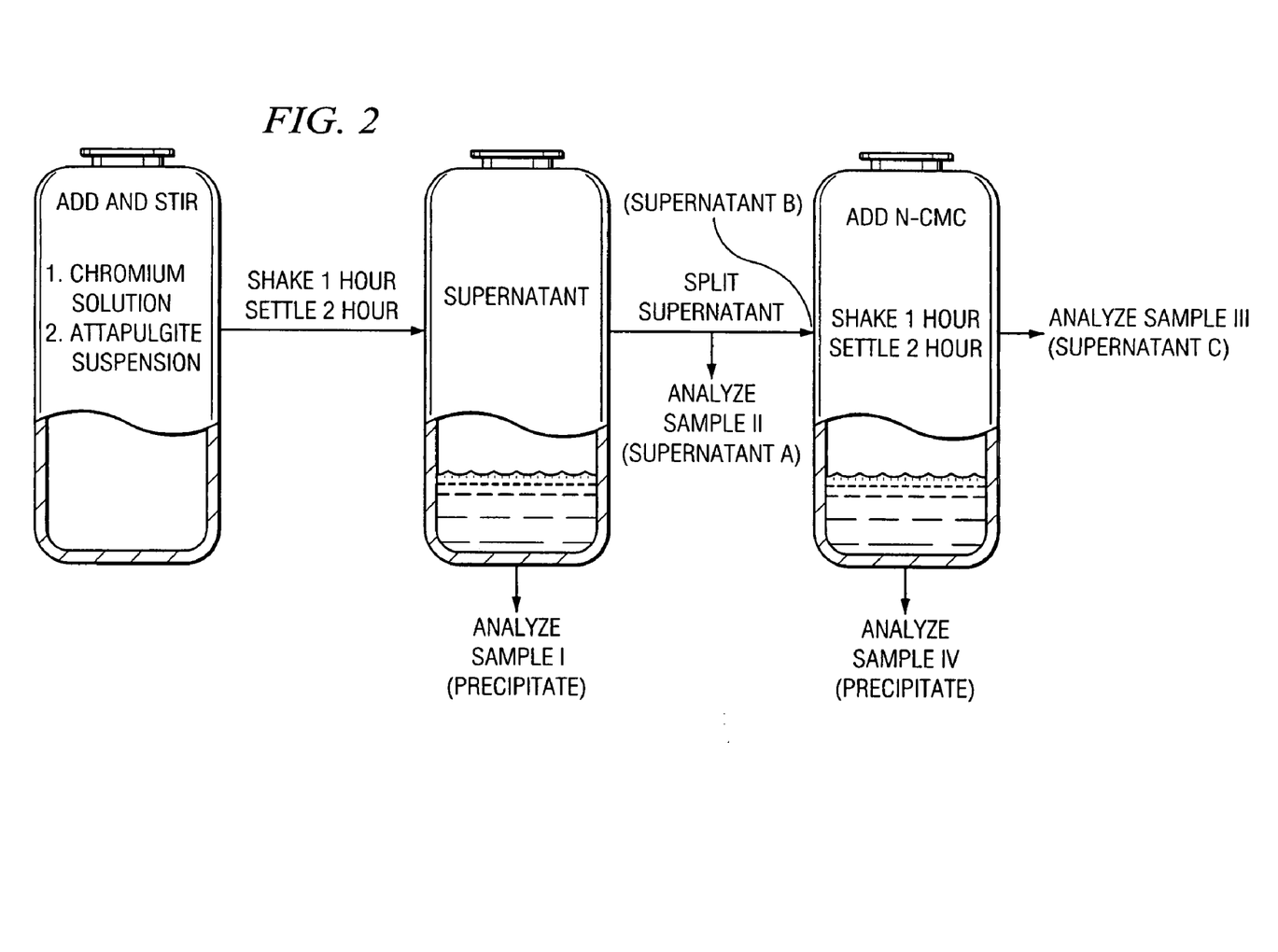
FIG. 2 depicts another method of chromium recovery by attapulgite and N-carboxymethyl chitosan in an aqueous solution, according to an embodiment of the present invention.
Figure 3:
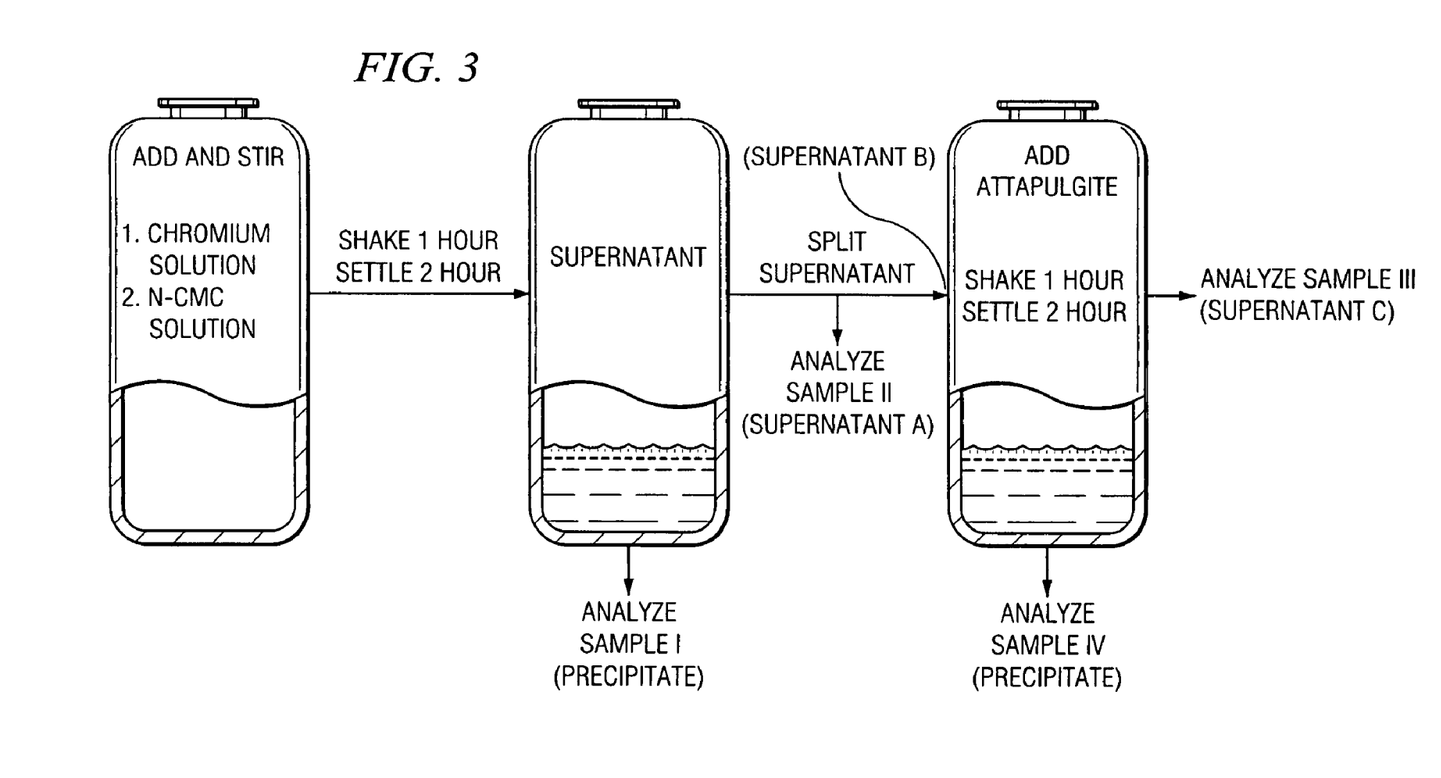
FIG. 3 depicts a third method of chromium recovery by attapulgite and N-carboxymethyl chitosan in an aqueous solution, according to an embodiment of the present invention.

Each sample was placed in a separate 250 ml amber bottle, which was tightly closed. Samples were incubated at room temperature (25° C.) under shaken or static conditions. Shaken conditions were determined to be preferable. After 1 hour of shaking/incubation a small amount of each sample was removed for flocculation analysis. The samples were then allowed to sit for 2 hours. Supernatant of each sample was then removed and partitioned into two halves to form subsamples A and B. Half of subsample B was removed again to form subsample C. Each subsample was further treated with either attapulgite or chitosan. The general design for these experiments is shown in FIGS. 1-3. The slurry remaining after supernatant removal also constituted another subsample. These subsamples were subjected to toxic metal analysis.

Flocculation analysis with the 1 hour incubation sample was performed using the procedures described above for sludge material analysis. Flocculation/settlement of each sample was determined at different time intervals after vortex shaking (15, 30 and 45 seconds, 1, 1:15, 1:30, 1:45 2, 3, 5, 10, 20, and 30 minutes). Time intervals of 15, 30 and 45 seconds, and 1, 1:15, 1:30, 1:45, 2 and 3 minutes were found to be most useful for analysis. Flocculation was best for combinations of chitosan and attapulgite (data not shown).

Toxic metal analysis was also performed as described above for sludge material analysis. Results are shown in Tables 4 and 5.

TABLE 4

Recovery of Chromium from Aqueous Solutions Treated with Attapulgite after Chitosan Treatment

| Combination | [Cr] in precipitate | | [Cr] in supernatant | | Total Cr recovery |
|---|---|---|---|---|---|
| | mg/L | % | mg/L | % | (%) |
| Control Cr (16 mg/L) | — | — | — | — | — |
| Cr + NCMC(0.5%) (I) | 14 | 11.4 | — | 89.0 | 11 |
| Cr + NCMC(0.5%) (II) | — | — | 12.0 | 13.3 | 87.0 |
| Cr + NCMC(0.5%) + Attapulgite(0.25%) (III) | — | — | 4.0 | 4.0 | 96.0 |
| Cr + NCMC(0.5%) + Attapulgite(0.25%) (IV) | — | — | 4.0 | 4.0 | 96.0 |

I - First precipitate
II - First supernatant
III - Supernatant after addition of Attapulgite
IV - Precipitate after addition of Attapulgite

TABLE 5

Recovery of Chromium at Different Concentrations from Aqueous Solutions Treated with Attapulgite or Attapulgite and Chitosan at Different Concentrations

| Combination | [Cr] in Supernatant | | Total Recovery |
|---|---|---|---|
| | mg/L | % | (%) |
| Control Cr (16 mg/L) | — | — | — |
| Control Cr (26 mg/L) | — | — | — |
| Control Cr (51 mg/L) | — | — | — |
| Cr (16 mg/L) + Attapulgite (0.62%) | 6.3 | 39.2 | 60.8 |
| Cr (26 mg/L) + Attapulgite (0.62%) | 8.2 | 31.7 | 68.3 |
| Cr (51 mg/L) + Attapulgite (0.62%) | 16.8 | 26.3 | 73.7 |
| Cr (16 mg/L) + Attapulgite (0.125%) | 9.2 | 17.4 | 82.6 |
| Cr (26 mg/L) + Attapulgite (0.125%) | 16.4 | 15.8 | 84.2 |
| Cr (51 mg/L) + Attapulgite (0.125%) | 34.3 | 15.0 | 85.0 |
| Cr (16 mg/L) + Attapulgite (0.25%) + NCMC (0.5%) | 5.8 | 26.5 | 73.5 |
| Cr (26 mg/L) + Attapulgite (0.25%) + NCMC (0.5%) | 10.1 | 26.0 | 73.5 |
| Cr (51 mg/L) + Attapulgite (0.25%) + NCMC (0.5%) | 21.0 | 24.2 | 75.8 |

Tables 4 and 5 show the efficacy of attapulgite+NCMC combinations in recovering chromium from aqueous solutions. The best results were seen when 0.5% NCMC was applied, followed by 0.25% attapulgite. Up to 96% of chromium was recovered under these conditions. Chromium recovery by 0.12% attapulgite alone was also good (85%).

Example 2

Removal of Radionuclides or Toxic Metals by Volcanic Ash with or without Chitosan Both weathered volcanic ash (JSC MARS-1) and 70% deacetylated native chitosan were used alone or in combination to remove uranium radionuclides from a 2% solution of uranium acetate. Chitosan solutions were prepared in acetic acid. The final pH of the mixture was adjusted to 3.5. Duplicate 100 mL samples were treated with chitosan (10 mL) or volcanic ash (20 g) alone or in combination. Amber brown bottles were used to protect against light effects. The samples were incubated at room temperature (25° C.) for 48 hours without shaking.

After incubation acid digestion was carried out according to Standard Methods for the Examination of Water and Waste Water, 19 Ed. (1995) (American Public Health Association, American Water Works Association, Water Environment Federation) using the Inductively Coupled Plasma (ICP) Method (3120 B) adapted for uranium analysis with the following specifications: a) Observed Wavelength=409.01 nm; b) Estimated Detection Limit=300 µg/L; c) Calibration Concentration=10 mg/L; and d) Upper Concentration Limit=100 mg/L. Results are presented in Table 6.

TABLE 6

Use of JSC MARS-1 Alone or in Combination with Chitosan to Remove Radionuclide Uranium from Solution

| Combination | Total Uranium (mg/L) | |
| --- | --- | --- |
| | Sample 1 | Sample 2 |
| Uranium alone | 5,850 | 5,790 |
| Uranium + JSC MARS-1 | 430 | 330 |
| Uranium + JSC MARS-1 + Chitosan | 563 | 535 |
| Uranium + Chitosan | 3,590 | 4,160 |

Table 6 shows that treatment with volcanic ash is most effective at removing uranium radionuclides from solution, followed by volcanic ash and chitosan. Both combinations are capable of removing >90% of the available uranium. Given that chitosan alone appears to have little effect on uranium concentration, it is most cost-effective in the present experiment to use volcanic ash alone. However, other forms of chitosan or chitin, such as NCMC may prove more effective when combined with JSC MARS-1 or different volcanic ash. Treatment with 5 ppm FeCl was also performed, but no positive effect on reducing uranium concentration was observed. (Results not shown.)

The ability of volcanic ash with or without chitosan to remove metal ions from solution was also studied using methodologies similar to those above. The results of an experiment using iron are presented in Table 7.

TABLE 7

Use of JSC MARS-1 Alone or in Combination with Chitosan to Remove Iron from Solution

| Combination | Total Iron (mg/kg) +/− SD |
| --- | --- |
| Iron alone | 572.33 +/− 195.24 |
| Iron + JSC MARS-1 | 240.67 +/− 48.27 |
| Iron + JSC MARS-1 + Chitosan | 229.00 +/− 69.22 |
| Iron + Chitosan | 708.67 +/− 69.86 |

Figure 4:
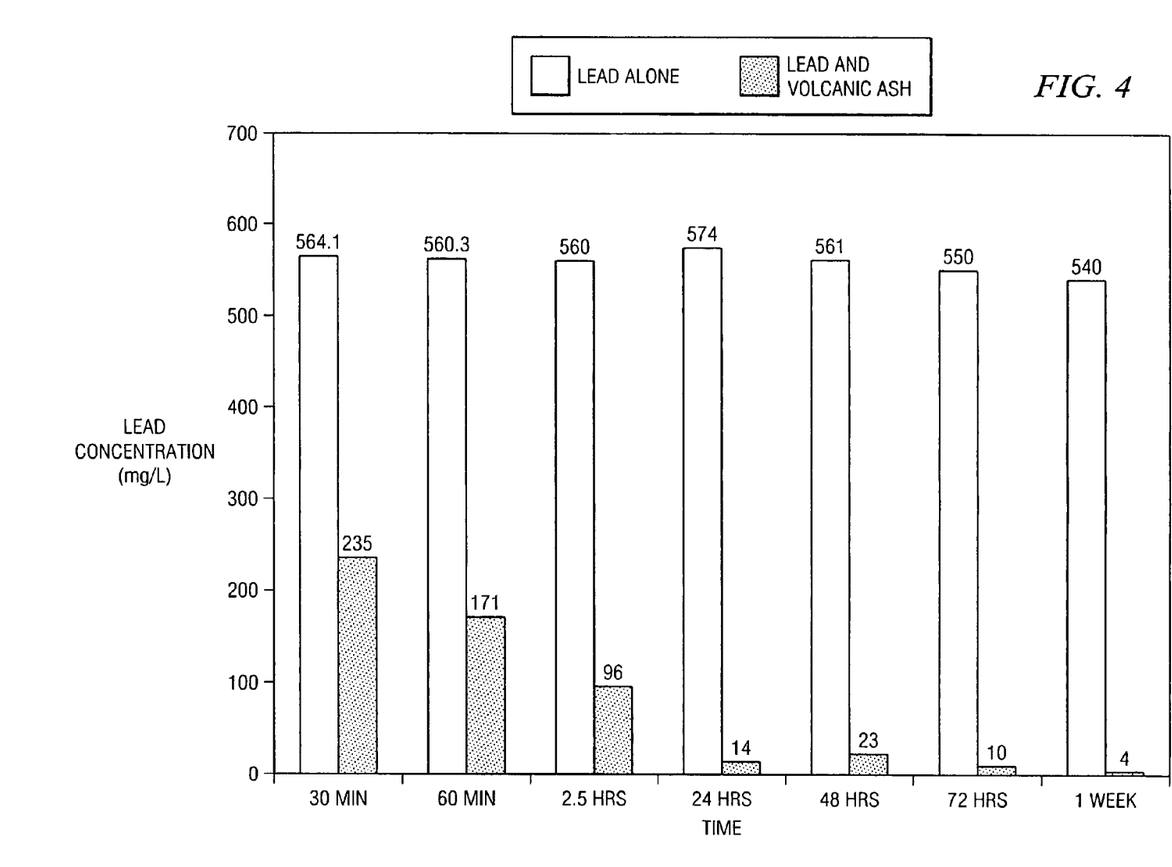
FIG. 4 is a graph depicting removal of lead from solution by weathered volcanic ash.

The results in Table 7 indicate that volcanic ash is effective at removing iron from solution. Similar results have been found for lead removal. (See FIG. 4.) In the case of toxic metal removal, it appears that addition of chitosan to volcanic ash may have a slightly beneficial effect. A more beneficial effect may be seen with other forms or chitin or chitosan or different volcanic ash.

Although the present invention and its advantages have been described in detail, it should be understood that various changes, substitutions and alternations can be made herein without departing from the spirit and scope of the invention as defined by the following claims.

The invention claimed is:

1. A method of removing a toxic metal from a source material comprising:
   adding attapulgite to the source material;
   adding N-carboxymethyl chitosan to the source material to form a mixture;
   removing a toxic metal from the mixture; and
   adjusting the pH of the mixture to a pH of 3.5.

2. The method of claim 1, further comprising the adding steps performed simultaneously.

3. The method of claim 1, further comprising adding attapulgite prior to adding chitosan.

4. The method of claim 1, further comprising adding chitosan prior to adding attapulgite.

5. The method of claim 1, further comprising adding volcanic ash to the source material.

6. The method of claim 5, wherein the volcanic ash comprises weathered volcanic ash.

7. The method of claim 1, wherein the toxic metal is selected from the group consisting of: lead, chromium, copper, zinc, iron and combinations thereof.

8. The method of claim 1, wherein the source material comprises an aqueous solution.

9. A removal system comprising weathered volcanic ash and chitin or chitosan, wherein the system is operable to remove at least one toxic metal or radionuclide from a source material.

10. The system of claim 9, wherein the toxic metal is selected from the group consisting of: lead, chromium, copper, zinc, iron and combinations thereof.

11. The system of claim 9, wherein the source material comprises an aqueous solution.

12. The system of claim 9, wherein the radionuclide comprises uranium.

13. The system of claim 9, wherein the source material comprises an aqueous solution.

14. A method of removing a toxic metal or radionuclide from a source material comprising:
   adding volcanic ash to the source material to form a mixture;
   adding chitin or chitosan to the source material; and
   removing a toxic metal or radionuclide from the mixture.

15. The method of claim 14, further comprising the adding steps performed simultaneously.

16. The method of claim 14, further comprising adjusting the pH of the mixture to an acidic level.

17. The method of claim 16, further comprising adjusting the pH of the mixture to 3.5.

18. A removal system comprising volcanic ash and chitin or chitosan, wherein the system is operable to remove uranium from a source material.

19. The system of claim 18, wherein the source material comprises an aqueous solution.

20. The system of claim 18, wherein the source material comprises an aqueous solution.

* * * * *